United States Patent [19]

Mönch

[11] Patent Number: 5,033,302
[45] Date of Patent: Jul. 23, 1991

[54] ROTARY BALANCING MACHINE MOUNTING ASSEMBLY WITH INTEGRAL CALIBRATION DEVICE

[75] Inventor: Uwe Mönch, Bensheim, Fed. Rep. of Germany

[73] Assignee: Gebr. Hofmann GmbH & Co. KG Maschinenfabrik, Pfungstadt, Fed. Rep. of Germany

[21] Appl. No.: 460,564

[22] Filed: Jan. 3, 1990

[30] Foreign Application Priority Data

Feb. 9, 1989 [DE] Fed. Rep. of Germany ....... 3903814

[51] Int. Cl.⁵ .................. G01M 1/20; G01M 1/22
[52] U.S. Cl. ........................... 73/460; 73/471; 73/475; 73/468; 73/462; 73/672
[58] Field of Search .............. 73/460, 471, 475, 468, 73/462, 51, 667, 672, 476, 477, 1 R, 1 D

[56] References Cited

U.S. PATENT DOCUMENTS 4,441,355 4/1984 Rothamel ........................... 73/1 R
4,750,361 6/1988 Bandhopadhyay .................. 73/462

FOREIGN PATENT DOCUMENTS

| 1678 | 1/1979 | Japan | 73/667 |
| 35226 | 3/1980 | Japan | 73/667 |
| 1379660 | 3/1988 | U.S.S.R. | 73/460 |
| 461387 | 2/1937 | United Kingdom | 73/51 |
| 861164 | 2/1961 | United Kingdom | 73/460 |

Primary Examiner—Hezron E. Williams
Assistant Examiner—Craig Miller
Attorney, Agent, or Firm—Cushman, Darby & Cushman

[57] ABSTRACT

A mounting stand in a balancing machine mounting assembly includes a stationary mounting block and a mount for a rotary member to be balanced. The mount is supported on the mounting block by two parallel springs capable of oscillating movement in a mounting plane in the measurement direction. The mounting stand further has at least one measurement value pick-up sensor operatively disposed between the mounting block and the oscillatable mount for detecting oscillation of the mount produced by an out-of-balance rotary member and to supply corresponding measurement signals. A rotatable adjusting unbalance weight of a known magnitude is mounted to the oscillatable mount and can be selectively brought into operation to cause oscillatory movement of the oscillatable system, to perform a calibration.

1 Claim, 1 Drawing Sheet

ROTARY BALANCING MACHINE MOUNTING ASSEMBLY WITH INTEGRAL CALIBRATION DEVICE

BACKGROUND OF THE INVENTION

A typical form of a balancing machine for balancing a rotary member or rotor may comprise a mounting assembly for rotatably supporting the rotary member to be balanced, the mounting assembly being formed, for example, by two spaced-apart mounting stands on which respective ends of the rotary member are carried. A mounting stand of that kind comprises a stationary mounting block or pedestal arrangement which is fixed in a stationary position to a machine bed during an unbalancing measuring operation. As indicated above, a horizontal balancing machine has two such mounting stands, with the spacing therebetween being adjustable, depending on the size of the rotary member to be balanced. For that purpose the two mounting stands can be displaced on the machine bed in the axial direction of the rotary member, and are then fixed to the machine bed in order to carry out the unbalance measuring operation. A mounting means for the rotary member to be balanced is supported on each mounting block or pedestal arrangement of each mounting stand, by way of a support assembly consisting of mutually parallel springs. By virtue of its spring suspension, the mounting means for the rotary member forms an assembly which is capable of oscillating in a mounting plane in a measuring direction, with one degree of freedom. Operatively disposed between the stationary mounting block or pedestal arrangement and the oscillatable mounting means is a measurement value pick-up means which measures a force or a travel movement in response to oscillatory movement of the mounting means produced by an out-of-balance rotary member. Thus the mounting means reacts to an out-of-balance rotary member in accordance with its specific, frequency-dependent oscillation amplitudes and its phase, with a precisely defined oscillation vector which is detected by the pick-up means and which is suitably converted into a corresponding electrical measurement signal.

In order to ensure that variations with respect to the mounting stand, in particular the oscillatable system thereof, due to aging phenomena or due to operational factors, which occur in the course of time, do not falsify the measurement values produced by the assembly, adjustment is made to the balancing machine mounting assembly and in particular the oscillatable system of each of the two mounting stands, at certain intervals of time. The adjustment operation is carried out by using an unbalance-free adjusting rotor which is fitted into position in the balancing machine mounting assembly and which is used to carry out adjustment measuring runs, that is to say measuring runs which are required solely for the purposes of suitably adjusting and setting the machine. It will be appreciated that the requirement for adjusting the machine from time to time means that it is necessary to interrupt normal balancing operations, during which rotary members to be balanced are continuously fitted into the balancing machine mounting assembly and subjected to a measurement and balancing procedure therein. Furthermore, it is also necessary to keep an additional adjustment rotor in a condition of readiness for use when a machine adjustment operation is to be carried out. Also, the fitting and removing the adjustment rotor, for carrying out the adjustment operation, involve a considerable amount of time and work.

SUMMARY OF THE INVENTION

An object of the present invention is to provide a mounting stand for a balancing machine mounting assembly, which permits adjustment of the machine to be carried out in a simple fashion.

Another object of the invention is to provide a mounting stand for a balancing machine mounting assembly, of such a configuration that there is no need to maintain a separate stock of components specifically for an operation of adjusting the machine.

In accordance with the invention, those and other objects are achieved by a mounting stand in a balancing machine mounting assembly comprising a mounting block or pedestal arrangement when in use is disposed in a fixed position. A mounting means for a rotary member to be balanced is supported on the mounting block by parallel spring support means, in such a way that the mounting means is capable of oscillating in a mounting plane in the measurement direction. At least one measurement value pick-up means is stationarily disposed between the mounting block and the oscillatable mounting means, to detect oscillatory movement of the latter produced by an out-of-balanced rotary member, thereby to supply corresponding measurement signals. Mounted to the oscillatable mounting means is a rotatable adjusting unbalance weight of known magnitude which is adapted to be selectively switched on to act on the measurement value pick-up means in the measurement direction. In that way the system consisting of the mounting means, the parallel spring support means and the measurement value pick-up means can be adjusted by reference to the measurement signal obtained by operation of the adjusting unbalance weight.

It will be seen therefore that, when the machine is used to carry out measuring runs with a rotary member to be balanced, the adjusting unbalance weight is not brought into operation and therefore does not act on the measurement value pick-up means. However, between the individual measuring runs on rotary members to be balanced, it is possible to effect adjustment of the system consisting of the mounting means, the parallel spring support means and the measurement value pick-up means, by switching on the adjusting unbalance weight, to carry out a quick and easy adjusting operation. The measurement signal which is produced in the adjusting run can be evaluated in such a way that it is compared to a signal corresponding to the known magnitude of unbalance of the adjusting unbalance weight. The evaluation circuit by which unbalance respect of rotary members to be balanced is determined with respect to magnitude and angular position can then be suitably set and adjusted on the basis of the adjusting measurement signal. It is also possible however to set and adjust the measurement value transducer means itself, depending on the adjusting measurement value obtained in the adjusting operation when the adjusting unbalance weight is rotated.

In accordance with a preferred feature the mounting means for supporting the rotary members to be balanced generally comprises a mounting frame which is supported by way of the parallel spring support means on the mounting block in such a way as to be capable of oscillating in the measuring direction, the mounting frame carrying a mounting device for the rotary member to be balanced. The adjusting unbalance weight can then be mounted on the mounting frame. The mounting device for supporting a rotary member may be a roller-type mounting arrangement or a prism-type mounting arrangement.

Further objects, features and advantages of the invention will become apparent from the following description of a preferred embodiment thereof.

DESCRIPTION OF THE PREFERRED EMBODIMENT

Figure 1:
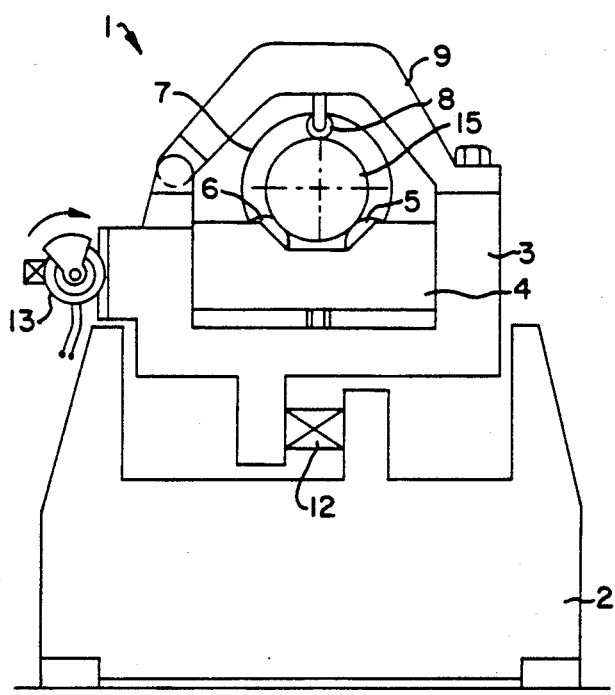
FIG. 1 is a front view of a mounting stand in accordance with the invention.

Referring to the drawings, a mounting stand 1 for use in a balancing machine mounting assembly comprises a mounting block or pedestal arrangement 2 which is fixed to a machine bed 14 while unbalance measuring runs are being carried out to ascertain the unbalance of rotary members which are possibly in need of balancing. In a balancing machine the balancing machine mounting assembly comprises two such mounting stands which are disposed at a spacing from each other, in a direction corresponding to the axial direction of the rotary member to be balanced.

Figure 2:
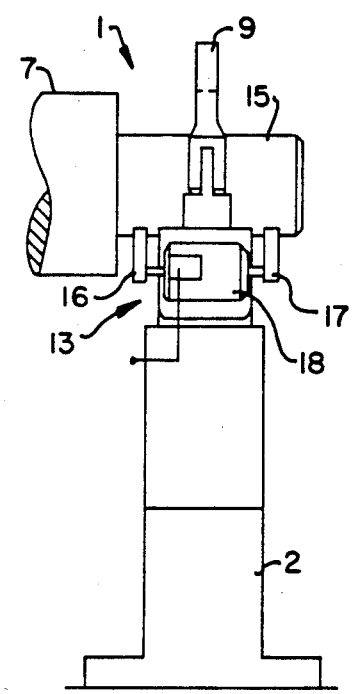
FIG. 2 is a side view of the FIG. 1 mounting stand.

For carrying out an unbalance measuring run, a rotary member 7 to be balanced is mounted for example by means of mounting trunnion portions indicated at 15 at respective ends of the rotary member, in the two spaced-apart mounting stands 1. The way in which the rotary member 7 is supported at one of the mounting stands 1 can be clearly seen from FIG. 2.

The mounting stand 1 further comprises a mounting frame 3 which is mounted in such a way as to be oscillatable on the stationary mounting block 2 of each mounting stand 1, by way of parallel springs indicated at 10 and 11. The parallel springs 10 and 11 are preferably leaf or blade springs which ensure that the mounting frame 3 can move with an oscillating motion relative to the mounting block 2 with one degree of freedom, that is to say parallel to the plane of the drawing in FIG. 1 and normal to the plane of the drawing in FIG. 2.

Disposed in the mounting frame 3 is a mounting bridge member 4 whose height is adjustable and which carries a rolling mounting assembly. The rolling mounting assembly comprises first and second support rollers 5 and 6 on which the rotary member 7 to be balanced is supported. A clamping member of arched configuration 9 is also mounted on the mounting frame 3, being connected to the mounting frame 3 by a pivot at the end of the member 9 which is at the left in FIG. 1, while the other end of the member 9 can be clamped to the mounting frame 3 by suitable screw means (shown but not reference in FIG. 1). The clamping member 9 carries a pressure roller 8 which, during an unbalance measuring run, is applied from above to the mounting trunnion portion 15 of the rotary member 7, which is supported on the support rollers 5 and 6, thereby to urge the trunnion portion 15 into contact with the support rollers 5 and 6 with a predetermined biasing force.

In the illustrated embodiment, an adjusting unbalance weight 13 of known magnitude is mounted to the mounting frame 3 at the left-hand end thereof in FIG. 1. The unbalance weight 13 can be selectively brought into operation by a suitable control means. In operation the adjusting unbalance weight 13 is thus caused to rotate, to produce an effect which will be described in greater detail hereinafter. The adjusting unbalance weight 13 is formed by two excitation unbalance weights 16 and 17 which are secured to the respective end portions of the shaft of an electric drive motor which is indicated at 18 in FIG. 2.

A measurement value pick-up 12 is operatively disposed between the oscillatable mounting frame 3 and the stationary mounting block 2. The pick-up 12 has its maximum measurement sensitivity in the measuring direction which coincides with the direction of oscillatory movement that is defined by the parallel springs 10 and 11. When carrying out a measurement run on a rotary member 7 to be balanced, the pick-up 12 outputs signals corresponding to the detected unbalance of the rotary member, to a suitable evaluation circuit (not shown) which is operable in known manner to process the signals supplied thereto.

For carrying out an adjustment operation of the system consisting of the mounting frame 3 with the rotary member mounting means, the parallel springs 10 and 11 and the pick-up 12, the electric motor 18 is switched on and an adjusting unbalance of known magnitude is produced by virtue of the rotary movement of the excitation unbalance weights 16 and 17, in the measurement plane of the mounting stand 1. The signal which is outputted by the pick-up 12 in that operation is related to a stored unbalance value which is produced by the two rotating unbalance weights 16 and 17 and suitable corrections are then effected for example at the evaluation arrangement (not shown) or at the measurement value pick-up 12 itself, if the measurement value which was outputted by the pick-up 12 during the adjusting operation and the stored known unbalance value corresponding to the rotating unbalance weights 16 and 17 are not in conformity with each other. There is therefore no need to carry out an adjusting operation by using a separate, unbalance-free adjusting rotary member which has to be brought to and fitted into the balancing machine to carry out the adjusting operation. The adjusting operation with the arrangement according to the invention can be easily and quickly carried out by simply bringing into operation the known adjusting unbalance weight 13.

The illustrated embodiment shows a rotary member mounting means in the form of a rolling mounting assembly as is employed in universal balancing machines. It will be appreciated that the invention can also be used with other forms of rotary member mounting means which use for example a prism-type mounting assembly. Prism-type mounting assemblies of that kind are used when balancing rotors which are fitted into the mounting means of the mounting stand 1 by means of their own specific support and mounting members, to carry out an unbalance measuring run.

The measurement value pick-up 12 may be a pick-up which operates by measuring a force or a travel movement. When used in a balancing machine which operates by measuring a force, a biasing spring may possibly be disposed between the stationary mounting block 2 and the mounting frame 3 for stressing the force-measuring pick-up 12 disposed between the mounting block 2 and the mounting frame 3.

The calibration operation, in accordance with the invention, can be used in relation to single-plane or two-plane balancing machines. In the latter case, an adjusting unbalance weight 13 is provided at each of the two spaced-apart mounting stands of the machine. Furthermore, while the illustrated embodiment involves a horizontal balancing machine, the principles of the invention can also be applied in relation to a vertical balancing machine which may be a single-plane or a two-plane balancing machine.

It will be appreciated that the above-described construction has been set forth solely by way of example and illustration of the principles of the present invention and that various modifications and alterations may be made therein without thereby departing from the spirit and scope of the invention.

I claim:

1. A rotary balancing machine mounting assembly for a two-plane rotary balancing machine having two mounting stands which are spaced apart from each other along the axial direction of a rotary member to be balanced, each mounting stand comprising:

a mounting base member which is stationary during operation of the mounting stand;

a mounting frame having a mounting assembly for supporting said rotary member;

means for oscillatably supporting said mounting frame relative to said mounting base member, the supporting means being oscillatable in an unbalance measurement plane;

measurement value pick-up means operatively disposed between the mounting base member and the mounting frame, for detecting the oscillation of the mounting frame relative to the mounting base member, the oscillation being produced by the rotation of an out-of-balance rotary member, and for supplying measurement signals corresponding to the unbalance of the rotary member; and an unbalance means mounted on one side of the mounting frame and operable to produce an unbalance effect of known magnitude and acting on said measurement value pick-up means in the mounting plane in the measurement direction;

said rotary balancing machine mounting assembly further including control means for selectively bringing said unbalance means into operation between the individual measuring runs on the rotary members to be balanced, thereby to produce a known measurement signal at said measurement value pick-up means for correct adjustment of the operational performance of each mounting stand.

* * * * *